United States Patent
Gasparini et al.

(10) Patent No.: US 7,783,883 B2
(45) Date of Patent: Aug. 24, 2010

(54) SYSTEM AND METHOD FOR VALIDATING E-MAIL MESSAGES

(75) Inventors: Louis A Gasparini, San Mateo, CA (US); William H Harris, Woodside, CA (US)

(73) Assignee: EMC Corporation, Hopkinton, MA (US)

( * ) Notice: Subject to any disclaimer, the term of this patent is extended or adjusted under 35 U.S.C. 154(b) by 1031 days.

(21) Appl. No.: 11/166,579

(22) Filed: Jun. 24, 2005

(65) Prior Publication Data

US 2006/0020795 A1 Jan. 26, 2006

Related U.S. Application Data

(60) Provisional application No. 60/583,288, filed on Jun. 25, 2004.

(51) Int. Cl.
*H04L 9/00* (2006.01)
(52) U.S. Cl. .................. 713/168; 713/161; 713/170; 726/2; 726/27; 726/30
(58) Field of Classification Search .................. 713/161, 713/168, 170; 726/2, 27, 30
See application file for complete search history.

(56) References Cited

U.S. PATENT DOCUMENTS 6,145,079 A * 11/2000 Mitty et al. .................. 713/170
6,584,564 B2 * 6/2003 Olkin et al. .................. 713/152
6,760,752 B1 * 7/2004 Liu et al. ...................... 709/206
7,007,068 B2 * 2/2006 Morkel ......................... 709/206
7,020,778 B1 * 3/2006 Miettinen et al. ........... 713/182
7,089,585 B1 * 8/2006 Dharmarajan .................. 726/8
7,325,127 B2 * 1/2008 Olkin et al. .................. 713/152
2004/0025057 A1 * 2/2004 Cook .......................... 713/201
2004/0148254 A1 * 7/2004 Hauser ......................... 705/39
2004/0177120 A1 * 9/2004 Kirsch ......................... 709/206
2005/0005164 A1 * 1/2005 Syiek et al. .................. 713/201
2005/0188020 A1   8/2005 Avritch et al.
2005/0204405 A1 * 9/2005 Wormington et al. ......... 726/27

OTHER PUBLICATIONS

International Search Report, Sep. 12, 2006, 2 pages.
Written Opinion of the International Searching Authority, Sep. 12, 2006, 5 pages.

* cited by examiner

*Primary Examiner*—Carl Colin
(74) *Attorney, Agent, or Firm*—Ryan, Mason & Lewis, LLP

(57) ABSTRACT

A system and method authenticates an e-mail message containing a code that may be sent as part of an advertising campaign. The code is a hashed hash result of a combination of the e-mail address to which the message was sent and a pass phrase for the campaign, along with an identifier of the campaign. To authenticate the message, the user supplies the user's e-mail address and the code and the system and method parses the code to identify the campaign identifier and hashed hash result, looks up the pass phrase using the campaign identifier, hashes the campaign identifier and e-mail address and hashes that hash result. If the hashed hash results match, the system and method indicates the message is authentic and otherwise, indicates the message is not authentic.

18 Claims, 3 Drawing Sheets

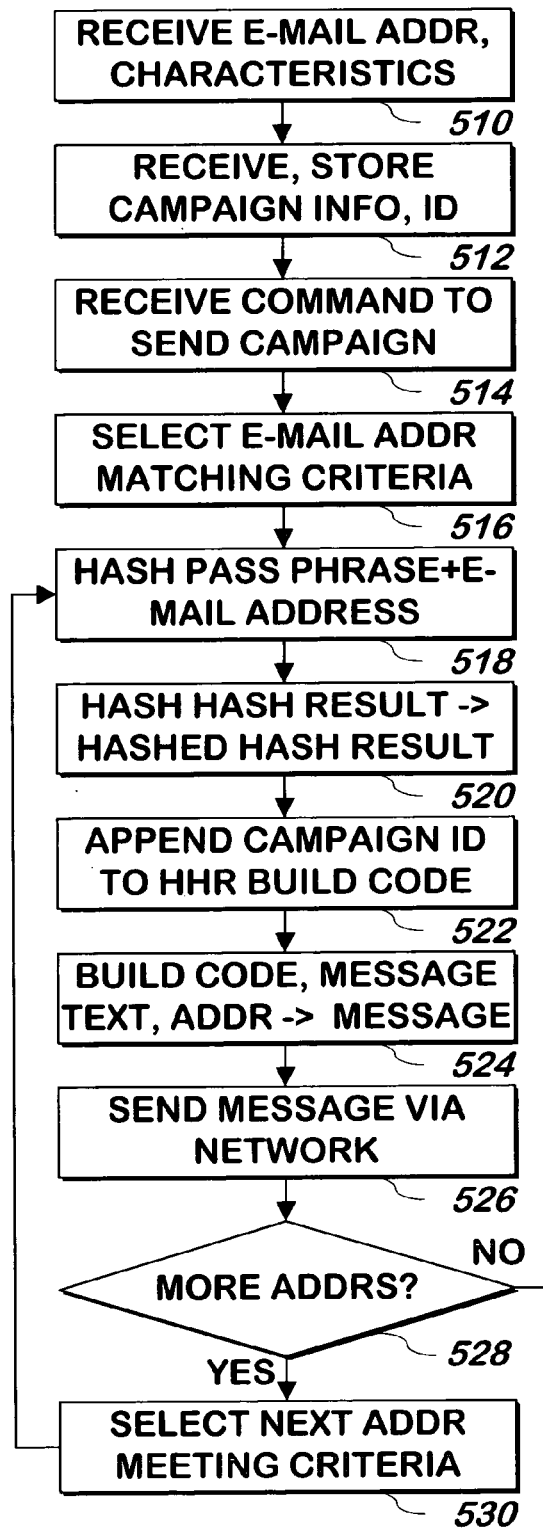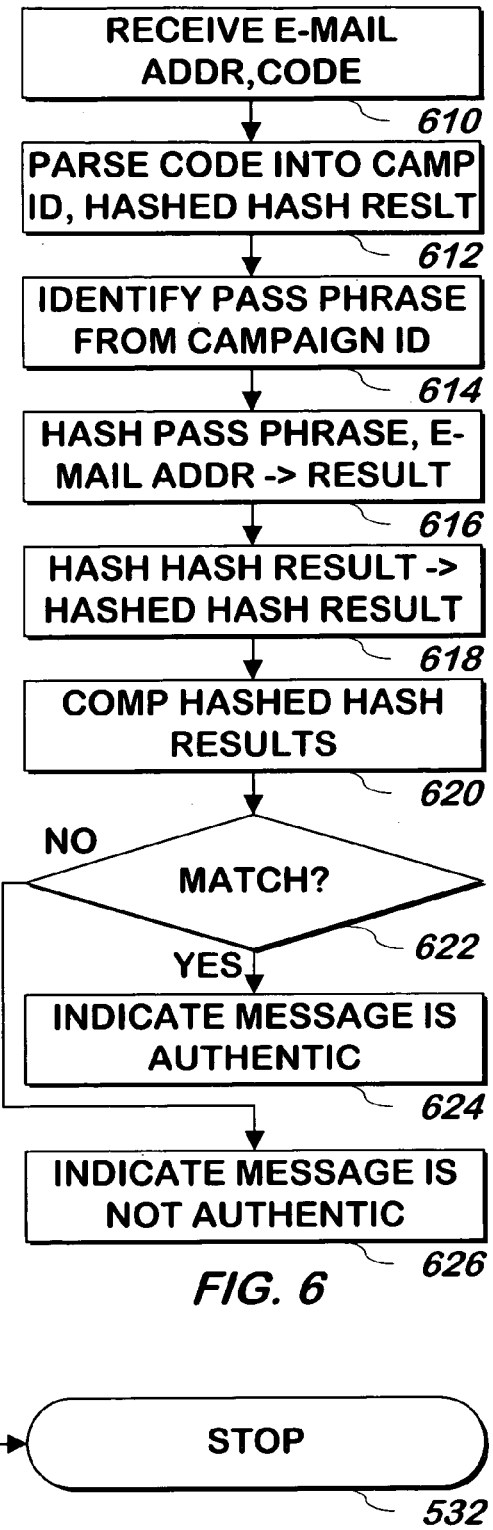
FIG. 5
FIG. 6

SYSTEM AND METHOD FOR VALIDATING E-MAIL MESSAGES

RELATED APPLICATION

This application claims the benefit of U.S. Provisional Application Ser. No. 60/583,288 entitled, "Method and Apparatus for Validating E-Mail Messages" filed by William Harris and Louis Gasparini on Jun. 25, 2004, having the same assignee as the present application, and is hereby incorporated by reference in its entirety.

FIELD OF THE INVENTION

The present invention is related to computer software and more specifically to computer software authenticating e-mail messages.

BACKGROUND OF THE INVENTION

It is a relatively simple process to falsify the source of an e-mail message. For example, an e-mail message from an unscrupulous party may be sent with a source address of a respected bank. The recipient of the message, believing that the message was really sent from that respected bank, may follow links contained in the message to open an account by supplying personal information such as name, address and a social security number. In fact, the links contained in the message take the recipient who follows them to a sever operated by the unscrupulous party, which has been carefully designed to appear as though it is operated by the respected bank. The unscrupulous party takes the information supplied by the recipient of the e-mail message and uses it to obtain credit from a different party in the recipient's name. The party supplying the credit checks the information supplied by the unscrupulous party against a database, and realizing it is authentic, supplies the credit to the unscrupulous party. The unscrupulous party can then use the credit to steal goods or services that the unscrupulous party resells.

Certain techniques allow the recipient of the e-mail message to authenticate the message if that party has a prior relationship with the respected bank or other sender of the message. However, if there is no such relationship, conventional techniques do not allow the recipient to authenticate the e-mail message.

What is needed is a system and method that can allow a recipient of an e-mail message to authenticate an e-mail message, whether or not that recipient has a prior relationship with the purported source of the e-mail message.

SUMMARY OF INVENTION

A system and method authenticates an e-mail message containing a code that may be sent as part of an advertising campaign. The code is a hashed hash result of a combination of the e-mail address to which the message was sent and a pass phrase for the campaign, along with an identifier of the campaign. To authenticate the message, the user supplies the user's e-mail address and the code and the system and method parses the code to identify the campaign identifier and hashed hash result, looks up the pass phrase using the campaign identifier, hashes the campaign identifier and e-mail address and hashes that hash result. If the hashed hash results match, the system and method indicates the message is authentic and otherwise, indicates the message is not authentic.

BRIEF DESCRIPTION OF THE DRAWINGS

FIG. 5 is a flowchart illustrating a method of building e-mail messages that can be authenticated according to one embodiment of the present invention.

FIG. 6 is a flowchart illustrating a method of authenticating an e-mail message according to one embodiment of the present invention.

DETAILED DESCRIPTION OF A PREFERRED EMBODIMENT

Figure 1:
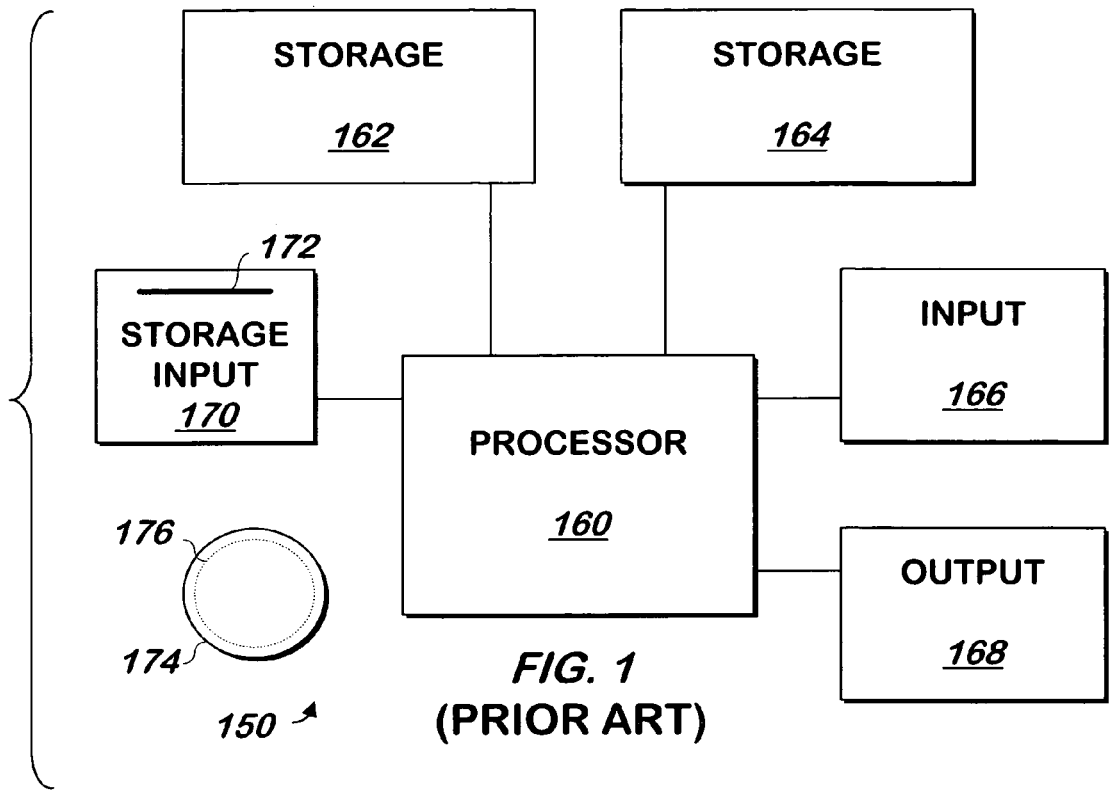
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
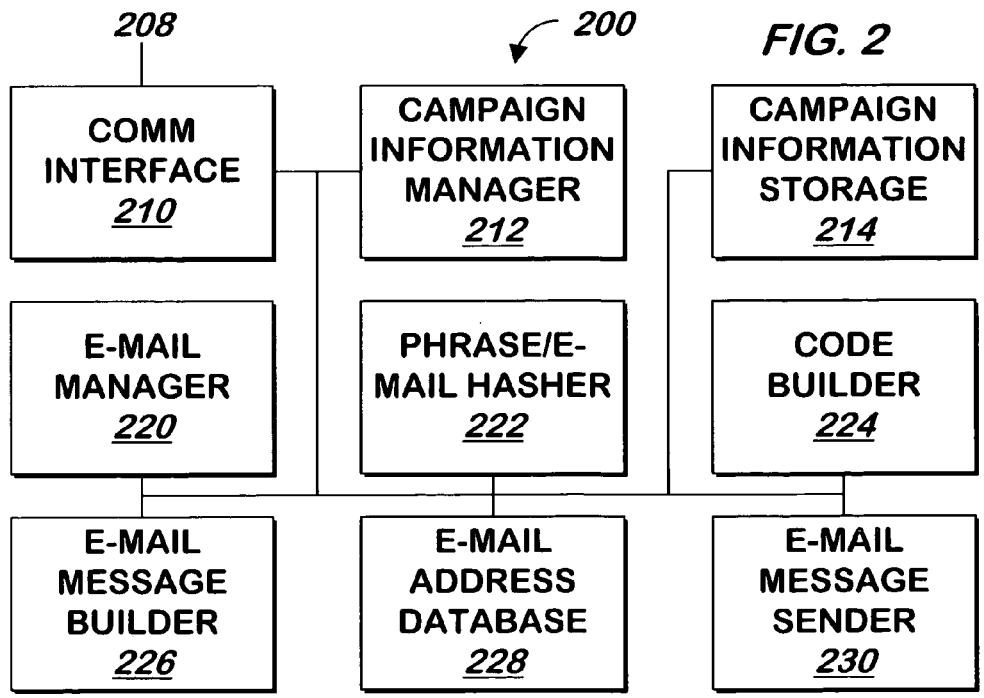
FIG. 2 is a block schematic diagram of a system for building e-mail messages that may be authenticated according to one embodiment of the present invention.

Referring now to FIG. 2, a system for generating and sending e-mail messages that can be authenticated is shown according to one embodiment of the present invention. In one embodiment, all communication into or out of system 200 is made via input/output 208 of communication interface 210 which is coupled to a network such as the Internet or a local area network or both. Communication interface 210 is a conventional communication interface that supports Ethernet, TCP/IP and/or other conventional communication protocols.

An Administrator Enters Campaign Information.

As used herein; e-mail messages are sent as part of an advertising campaign. However, the system and method applies to any type of e-mail message. A system administrator stores campaign information into campaign information storage 214. To store information in campaign information storage 214, the system administrator uses communication interface 210 to access a user interface provided by campaign information manager 212. The system administrator uses the user interface provided by campaign information manager 212 to store into campaign information storage 214, via the operating system, campaign information, which may include a unique campaign identifier, the message text to be placed in the body of the e-mail message, an optional set of at least one criteria indicating to whom the e-mail messages for the campaign should be sent, and a pass phrase for the campaign. Campaign information storage 214 may be either disk or memory storage or both and may contain a conventional database. In one embodiment, campaign information storage 214 is structured such that each component of the campaign information provided by the system administrator is associated with the unique campaign identifier to which that component corresponds, such as by including all of the information for each of several campaigns into a conventional database record. The pass phrase may be different from one campaign to the next and may be a sufficiently long enough string of text to make it difficult to guess.

Trigger the Generation of the Messages.

After the system administrator has finished using campaign information manager 212 to store the campaign information into campaign information storage 214, the system administrator is able to instruct the system 200 to build and send the e-mail message to those recipients that match the criteria described above. To do so, system administrator indicates that a campaign is to be sent by providing e-mail manager 220 with the unique campaign identifier associated with the campaign information as described above.

Retrieve an E-Mail Address Matching the Criteria

When e-mail manager 220 receives the campaign identifier, e-mail manager 220 retrieves the characteristics of the campaign and other campaign information corresponding to the campaign identifier and selects the first e-mail address it locates in e-mail address database 228 that corresponds to characteristics that meet the criteria corresponding to that campaign identifier in campaign information storage 214.

To select the first e-mail address, e-mail manager 220 searches e-mail address database 228 for a record associated with an e-mail address that has the at least one characteristic that matches the criteria associated with the campaign identifier provided by the system administrator to e-mail manager 220. In one embodiment, e-mail address database 228 is a conventional database and holds records containing an e-mail address and at least one characteristic of the e-mail address, each of which are associated with the e-mail address. In one embodiment, the information in the records in e-mail address database 228 was previously received and stored by the system administrator. When e-mail manager 220 finds a record where the characteristics match the criteria associated with the campaign identifier provided by the system administrator, e-mail manager 220 retrieves the e-mail address associated with those characteristics. In one embodiment, the record contains more characteristics than the number of criteria specified by the system administrator. If the record has a matching characteristic for each of the criteria specified by the system administrator, e-mail manager 220 determines that the record matches the criteria and retrieves the e-mail address associated with those characteristics. If the record does not have a matching characteristic for each of the criteria associated with the campaign identifier provided by the system administrator, e-mail manager 220 determines that the user will not be a recipient of the e-mail message.

Generate the Hash Result.

When e-mail manager 220 finds an e-mail address having all of the characteristics specified by the criteria associated with the campaign identifier previously provided to e-mail manager 220 by the system administrator and retrieves the e-mail address, e-mail manager 220 provides a hash request to phrase/e-mail hasher 222 which includes the retrieved e-mail address and the pass phrase of the campaign included in the campaign information previously retrieved from campaign information storage by e-mail manager 220. Phrase/e-mail hasher 222 receives the hash request from e-mail manager 220, concatenates the e-mail address and pass phrase, and hashes the concatenated result using conventional hash techniques. In one embodiment, the hash function used to hash the file is any conventional hash function such as the SHA-1, MD-4, or MD-5 hash functions. The SHA-1, MD-4, MD-5 hash functions and others are described in Schneier, *Applied Cryptography* (Wiley, 2d ed. 1996) ISBN: 0-471-11709-9, which is hereby incorporated by reference in its entirety. Although hashing is described herein, any transformative function that has collision resistance and are not easily reversible, such as is found with one-way hash functions, may be used. Phrase/e-mail hasher 222 produces a hash result from hashing the concatenated e-mail address and pass phrase, which phrase/e-mail hasher 222 returns to e-mail manager 220.

Generate the Code.

When e-mail manager 220 receives the hash result from phrase/e-mail hasher 222, e-mail manager 220 then causes a code to be generated to utilize in building the e-mail message to the user and which will be later used for verification purposes as described below. To cause the code to be generated, e-mail manager 220 provides the hash result and the campaign identifier previously provided by the system administrator to code builder 224. When code builder 224 receives the hash result and campaign identifier from e-mail manager 220, code builder 224 builds a code. To build the code, code builder 224 hashes the hash result provided by e-mail manager 220. In one embodiment, the result of the hashing done by code builder 224 is a subset of the bytes in the original hash result provided by e-mail manager 220 to code builder 224. In one embodiment, the result of the hashing done by code builder 224 is a different hash result from the original hash result provided by e-mail manager 220. Once code builder 224 produces the hashed hash result, code builder 224 builds the completed code by concatenating the hashed hash result with the campaign identifier provided by e-mail manager 220. Code builder 224 returns the code to e-mail manager 220.

As noted herein, a "hash" may be any transformation and is not limited to conventional hashing functions, although in one embodiment, it may be so limited, and each hash that occurs as described herein may use a different transformation function from any other hash.

In one embodiment, the purpose of the first hash is to make a one way, collision-avoiding transformation, and the purpose of any subsequent hash is to make it easier for the user to handle the result. In one embodiment, the hashed hash result may itself be hashed or otherwise transformed. In one embodiment, this transformation involves segregating the characters in the hash result into multiple groups, and transforming each group into a word or number according to a lookup table. Thus, the hash result dhdfyeitoeyi may be segregated into three groups dhdf, yeit and oeyi, with the first group mapping into a noun, the second group mapping into a verb and the third group mapping into another noun. Using a lookup table, the three groups may map into "dogs" "like" and "food" to build the phrase "dogs like food" and this phrase is used as the hashed hash result. This resulting phrase may be easier for a user to handle than "dhdfyeitoeyi". Any similar transformation may be used, including transforming one group into numbers, such as "dogs 1123 food".

Build the E-mail Message.

When e-mail manager 220 receives the code from code builder 224, e-mail manager 220 causes the e-mail message to be built for the designated recipient. To cause the e-mail message to be built for the designated recipient, e-mail manager 220 provides e-mail message builder 226 with an e-mail message build request that includes the code received from code builder 224, the e-mail address of the user retrieved from e-mail address database 228, the message text of the e-mail message previously retrieved from campaign information storage 214 by e-mail manager 220.

When e-mail message builder 226 receives the e-mail message build request, e-mail message builder 226 builds the e-mail message using conventional e-mail message building techniques, incorporating into the e-mail message the components provided by e-mail manager 220 in the e-mail message build request as described above. The construction of e-mail messages is well known, and can be found in Wood, *Programming Internet E-mail*, (O'Reilly 1999 ISBN 1-56592-479-7), which is hereby incorporated by reference in its entirety. When e-mail message builder 226 finishes building the e-mail message, e-mail message builder 226 provides the constructed e-mail message to e-mail message sender 230 to send to the recipient.

Send the E-mail Message.

When e-mail message sender 230 receives the e-mail message from e-mail message builder 226, e-mail message sender 230 sends the e-mail message to the recipient using conventional e-mail message sending techniques via communication interface 210.

Select Another E-Mail Address Corresponding to the Campaign Criteria and Repeat the Process.

After e-mail manager 220 provides e-mail message builder with the e-mail message build request as described above, e-mail manager 220 attempts to find another user e-mail address in e-mail address database that has associated characteristics that match all of the criteria associated with the previously provided campaign identifier as described above. If e-mail manager 220 finds such an e-mail address, e-mail manager 220 repeats the process described above to generate and send an e-mail message to the recipient that corresponds to the campaign having the identifier it received. E-mail manager 220 repeats the above process until all e-mail addresses in e-mail address database 228 that meet the criteria associated with the campaign identifier have been processed as described above.

Overview of Network.

Figure 3:
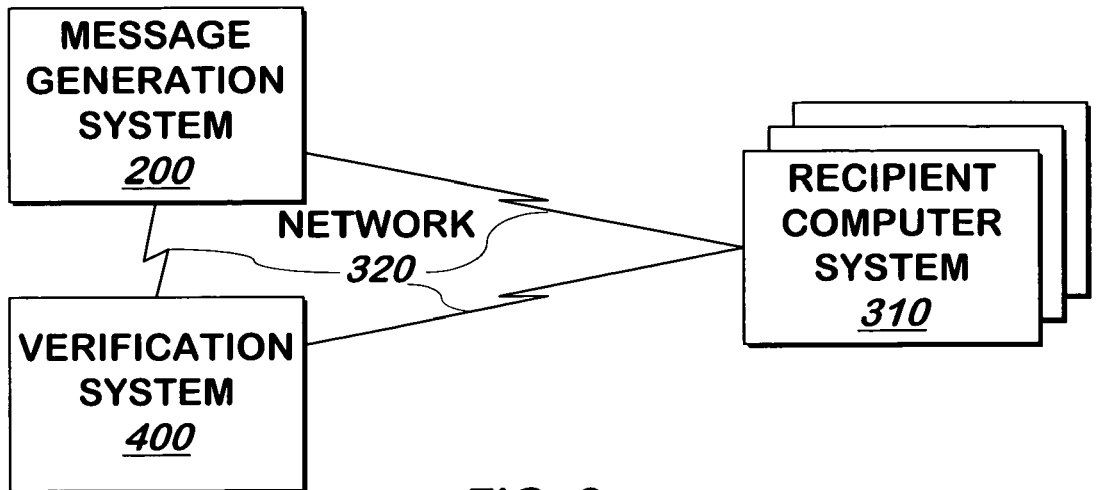
FIG. 3 is a block schematic diagram of the systems of FIGS. 2 and 4 coupled to a recipient computer system and to each other via a network.

Referring now to FIG. 3, the system 200 of FIG. 2 is shown coupled to a network 320 containing multiple recipient computer systems, of which recipient computer system 310 is representative, and a verification system 400 described below with reference to FIG. 4. Although verification system 400 is shown as a separate system from system 200, systems 200, 400 may be part of the same computer system, or they may be separate systems as shown, that are or are not coupled to one another via network 320. Network 320 may include a local area network, the Internet, or both.

The User Receives the E-Mail Message.

The recipient of each e-mail message sent as described above may retrieve the e-mail message from a conventional mail server (not shown) that receives messages addressed to the e-mail address of the recipient. Although there may be many recipients retrieving e-mail messages from the same or different mail servers into their recipient computer systems, a representative recipient is now described.

Authenticating the E-Mail Message.

When the recipient receives the e-mail message from system 200 as described above, the recipient may wish to authenticate the e-mail message. As noted above, the e-mail message contains a code, built as described above. The recipient may use a conventional browser in recipient computer system 310 to navigate to a web server operated by the purported source of the e-mail message. Recipient computer system 310 contains a conventional computer system, such as the system described with reference to FIG. 1. In one embodiment, verification system 400 includes that conventional web server, as well as the elements described below.

Receive a Web Page.

Figure 4:
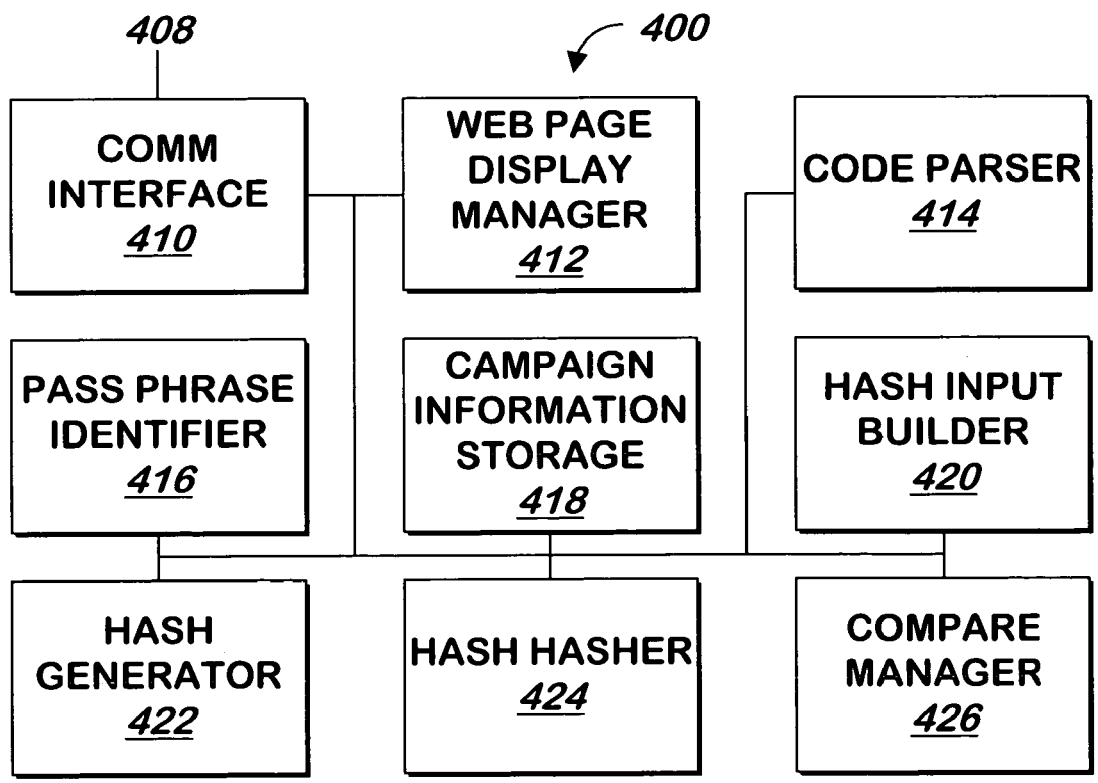
FIG. 4 is a block schematic diagram of a system for authenticating an e-mail message according to one embodiment of the present invention.

Referring now to FIG. 4, a verification system 400 is shown according to one embodiment of the present invention. When the user navigates to the web server, the web server signals web page display manager 412, which provides a web page to the user via communication interface 410, which is coupled to network 320 via input/output 408. Communication interface 410 is a conventional communication interface, similar to, or identical to communication interface 210 described above. The web page provided by web page display manager 412 may provide, or may provide a link to a different web page also provided by web page display manager 412 that provides, user interface elements that allow the user to enter the code from the e-mail message sent as described above, as well as the user's e-mail address at which the message was received. Web page display manager 412 receives the code and e-mail address using conventional techniques such as CGI, and provides them to code parser 414.

Parse the Code.

Code parser 414 receives the code and e-mail address and parses the code into its two component parts: the campaign identifier and the hashed hash result, and provides the e-mail address, the campaign identifier and the hashed hash result to pass phrase identifier 416.

Look Up the Pass Phrase.

When pass phrase identifier 416 receives the e-mail address, the campaign identifier and the hashed hash result, it uses the campaign identifier to look up the pass phrase from campaign information storage 418. Campaign information storage 418 may be the same storage as campaign information storage 214, or it may be similar, but different storage, and may receive the one or more campaign identifiers and the pass phrase corresponding to each such campaign identifier stored in campaign information storage 214. For example, in one embodiment, when the system administrator supplies the campaign information to campaign information manager 212, campaign information manager 212 may supply the campaign identifier and pass phrase to campaign information storage 418 via network 320. When pass phrase identifier 416 has obtained from campaign information storage 418 the pass phrase corresponding to the campaign identifier it receives, it provides the e-mail address, the campaign identifier, the hashed hash result it receives and the pass phrase it retrieves to hash input builder 420.

Build the Hash Input.

When hash input builder 420 receives the e-mail address, the campaign identifier, the hashed hash result and the pass phrase, hash input builder 420 builds a hash input containing a concatenation of the pass phrase and the e-mail address. It isn't necessary to use a concatenation of the pass phrase and e-mail address as long as some or all of this information is combined in the same manner as phrase/e-mail hasher 222 used. For example, the pass phrase and some or all of the e-mail address may be intermixed in a particular fashion by phrase/e-mail hasher 222 before it produces the hash result, and that same intermixing is performed by hash input builder 420. In other embodiments, the e-mail address is transformed into a string that corresponds to, but is different from, the e-mail address by both phrase/e-mail hasher 222 and hash input builder 420, for example, by providing the e-mail address backwards, or removing every fifth letter, before it is hashed, though such a transformation can itself be the same as an e-mail address using an identity transformation function. When hash input builder 420 has completed building the hash input, it provides the hashed hash result and the hash input to hash generator 422.

Hash the Hash Input and Hash the Result.

When hash generator 422 receives the hashed hash result and the hash input, it hashes the hash input using the same hash function as was used by phrase/e-mail hasher 222 to produce a hash result, and provides the hash result and the hashed hash result to hash hasher 424. Hash hasher hashes the hash result one or more times in the same manner as was used by code builder 224 as described above. It isn't necessary for either code builder 224 or hash hasher 424 to hash the hash results one or more times, but doing so can make the hash result easier for the recipient to manage. If the hash result is not hashed, one can think of it as if the hash function used by hash hasher 424 and code builder 224 is the identity function. When hash hasher 424 has completed hashing the hash result, hash hasher provides the hashed hash result it built and the hashed hash result it received to compare manager 426.

Compare the Hashed Hash Results.

When compare manager 426 receives the two hashed hash results, compare manager 426 compares the two hashed hash results and if the two hashed hash results are the same, it so indicates to web page display manager 412, and otherwise, it indicates that there is an error to web page display manager 412.

Indicate to the Recipient Whether the Message is Authentic.

Web page display manager 412 receives the indication that the hashed hash results matched or the error message from compare manager 426. If the indication indicating the two hashed hash results matched is received, web page display manager 412 builds and provides a web page to recipient computer system 310 a web page indicating that the e-mail message was valid and can be trusted. The user can then click links in the e-mail message or trust other information in the e-mail message secure in the knowledge that the e-mail message was authentic.

If web page display manager 412 receives the error message from compare manager 426, web page display manager 412 builds and provides to recipient computer system 310 a web page indicating that the message is invalid, and should not be trusted. The user may then disregard the e-mail message.

In another embodiment, instead of providing the e-mail address and code to web page display manager 412, the user can paste the entire e-mail message into web page display manager 412. Web page display manager 412 parses the message and extracts the user's e-mail address (which may have been added to the body of the message by e-mail message builder 226) and the code, and performs the functions described above. If it receives an indication from compare manager 426 that the two hashed hash results were the same, web page display manager 412 builds and displays a web page that contains the message, other information corresponding to the campaign such as links or other information, or both, and otherwise, it indicates that the message was not authentic. The other information corresponding to the campaign may be stored in campaign information storage 418, campaign information storage 214 or both, associated with the identifier for the campaign, for example, by a system administrator storing such information in campaign information storage 214. Campaign information manager 212, may then store this information into campaign information storage 418 as described above.

In one embodiment, the code does not contain the campaign identifier. In such embodiment, pass phrase identifier 416 retrieves all of the pass phrases for all campaigns and provides them to hash input builder, which provides to hash generator 422 a set of hash inputs, each one in the set corresponding to a different pass phrase and built as described above, and hash generator 422 hashes each of the hash inputs in the set to produce a set of hash results. Hash generator 422 provides the set of hash results to hash hasher 424, which produces a set of hashed hash results, each as described above, and provides the set to compare manager 426. Compare manager 426 compares the hashed hash result received from the recipient with each of the hashed hash results in the set and if the hashed hash result received from the recipient matches any of the hashed hash results in the set, compare manager indicates that the hashed hash results match, and otherwise provides the error message as described above.

Methods.

Referring now to FIG. 5, a method of generating e-mail messages that may be authenticated is shown according to one embodiment of the present invention. An at least one e-mail address and corresponding characteristics of the user of the e-mail address are received and stored in a database 510. Campaign information and a corresponding campaign identifier are provided and stored 512 as described above. A command to send the campaign is received 514. An e-mail address with corresponding characteristics matching the criteria of the campaign information is selected 516. The selected e-mail address (or a transformation of the e-mail address) and campaign pass phrase are concatenated, and then the result is hashed to produce a hash result 518 as described above. The hash result is then hashed one or more times to produce a hashed hash result 520 as described above. The hashed hash result is joined with the campaign identifier to produce a code 522. An e-mail message is built using the code, the message text from the campaign information and the e-mail address 524. The e-mail message is sent to the e-mail address via the network 526. If there are more e-mail addresses that meet the criteria of the campaign information 528, the next matching e-mail address is selected 530 and the process repeats at step 518. Otherwise 528, the method terminates 532.

Referring now to FIG. 6, a method of authenticating an e-mail message is shown according to one embodiment of the present invention. An e-mail address and a code are received 610 as described above. The code is parsed 612 into a campaign identifier and hashed hash result. The pass phrase for the campaign corresponding to the campaign identifier parsed in step 612 is identified 614. The pass phrase and e-mail address are hashed 616 as described above. The hash result of step 616 is hashed one or more times 618 as described above and compared 620 to the hashed hash result parsed in step 612. If the two hashed hash results match 622, the message may be indicated 624 as authentic as described above, and otherwise 622, the message is indicated 626 to be not authentic.

As noted above, the code may not contain the campaign identifier, in which case the pass phrases of all campaign identifiers may be used as described above.

What is claimed is:

1. A method of authenticating an e-mail message, comprising the steps of:
   receiving from a user an e-mail address and a code, the code having been received by the user with an e-mail message sent to the e-mail address;
   hashing, at least one time, a set of data comprising a string corresponding to at least a portion of the e-mail address, and an identifier not received by the user, to produce a hash result;
   comparing the hash result with the code;
   responsive to the code corresponding to the hash result, indicating the e-mail message is authentic; and
   responsive to the code not corresponding to the hash result, indicating the e-mail message is not authentic;
   wherein the identifier comprises a pass phrase;
   wherein the e-mail message is one of a given set of e-mail messages sent to respective ones of a plurality of e-mail addresses, and the identifier corresponds to the given set of e-mail messages such that each e-mail message within the given set of e-mail messages is associated with that identifier; and
   wherein the steps are performed by at least one processor operatively coupled to at least one storage.

2. The method of claim 1 wherein the set of data is hashed at least two times.

3. The method of claim 1 wherein the string corresponding to the e-mail address comprises the e-mail address.

4. The method of claim 1 wherein the code corresponds to the hash result if the code is identical to the hash result.

5. The method of claim 1 wherein the code received by the user is generated using the identifier.

6. The method of claim 1 wherein the given set of e-mail messages is one of a plurality of sets of e-mail messages sent by a particular sender, and the identifier is one of a plurality of identifiers corresponding to respective ones of the plurality of sets of e-mail messages.

7. The method of claim 6 wherein the hashing step further comprises hashing, at least one time, the set of data comprising a string corresponding to at least a portion of the e-mail address, and at least another one of the plurality of identifiers, to produce at least another one of a plurality of hash results; and wherein the comparing step comprises comparing each of at least a portion of the plurality of hash results with the code.

8. The method of claim 1 wherein, prior to the hashing step, the identifier is determined at least in part by parsing the code received from the user.

9. A method of providing an authentication code for an e-mail message, comprising:
   for each of a given set of e-mail messages to be sent to respective ones of a plurality of e-mail addresses, hashing, at least one time, a set of data comprising at least a portion of a string corresponding to the e-mail address to which that e-mail message will be sent and an identifier corresponding to the given set of e-mail messages such that e-mail message within the given set of e-mail messages is associated with that identifier, to produce a hash result; and
   providing the code based at least in part on the hash result within the e-mail message;
   wherein the identifier comprises a pass phrase and is not received with the e-mail message; and
   wherein the steps are performed by at least one processor operatively coupled to at least one storage.

10. The method of claim 9 wherein the hashing is performed at least two times.

11. The method of claim 9 wherein the given set of e-mail messages is one of a plurality of sets of e-mail messages sent by a particular sender, and the identifier is one of a plurality of identifiers corresponding to respective ones of the plurality of sets of e-mail messages.

12. The method of claim 9 wherein the code is generated by:
   segregating the hash result into a plurality of parts; and
   transforming each of at least a portion of the plurality of parts into a corresponding group of one or more characters.

13. The method of claim 12 wherein the corresponding group of one or more characters comprises a word.

14. A system for authenticating an e-mail message, comprising:
   at least one storage; and
   a processor operatively coupled to the at least one storage, the processor being operative to perform the steps of:
   receiving from a user an e-mail address and a code, the code having been received by the user with an e-mail message sent to the e-mail address;
   hashing, at least one time, a set of data comprising a string corresponding to at least a portion of the e-mail address, and an identifier not received with the e-mail message, to produce a hash result;
   comparing the hash result with the code;
   responsive to the code corresponding to the hash result, indicating the e-mail message is authentic; and
   responsive to the code not corresponding to the hash result, indicating the e-mail message is not authentic;
   wherein the identifier comprises a pass phrase; and
   wherein the e-mail message is one of a given set of e-mail messages sent to respective ones of a plurality of e-mail addresses, and the identifier corresponds to the given set of e-mail messages.

15. The system of claim 14 wherein the code received by the user is generated using the identifier.

16. The system of claim 14 wherein the given set of e-mail messages is one of a plurality of sets of e-mail messages sent by a particular sender, and the identifier is one of a plurality of identifiers corresponding to respective ones of the plurality of sets of e-mail messages.

17. The system of claim 16 wherein the hashing step further comprises hashing, at least one time, the set of data comprising a string corresponding to at least a portion of the e-mail address, and at least another one of the plurality of identifiers, to produce at least another one of a plurality of hash results, and the comparing step comprises comparing each of at least a portion of the plurality of hash results with the code.

18. The system of claim 14 wherein, prior to the hashing step, the identifier is determined at least in part by parsing the code received from the user.

* * * * *

UNITED STATES PATENT AND TRADEMARK OFFICE
CERTIFICATE OF CORRECTION

PATENT NO. : 7,783,883 B2  Page 1 of 1
APPLICATION NO. : 11/166579
DATED : August 24, 2010
INVENTOR(S) : Louis A. Gasparini It is certified that error appears in the above-identified patent and that said Letters Patent is hereby corrected as shown below:

In the Claims:

Claim 9, col. 10, line 2, please insert --each-- after "that".

Signed and Sealed this

Ninth Day of November, 2010

David J. Kappos
*Director of the United States Patent and Trademark Office*